(12) United States Patent
Sharma et al.

(10) Patent No.: US 10,248,719 B2
(45) Date of Patent: Apr. 2, 2019

(54) SYSTEM AND METHOD FOR ANALYSING TEMPORAL TEXT DATA

(71) Applicant: Tata Consultancy Services Limited, Mumbai (IN)

(72) Inventors: Geetika Sharma, Gurgaon (IN); Lipika Dey, Gurgaon (IN); Aditeya Pandey, Gurgaon (IN); Kunal Ranjan, Gurgaon (IN)

(73) Assignee: Tata Consultancy Services Limited, Mumbai (IN)

( * ) Notice: Subject to any disclaimer, the term of this patent is extended or adjusted under 35 U.S.C. 154(b) by 277 days.

(21) Appl. No.: 15/245,107

(22) Filed: Aug. 23, 2016

(65) Prior Publication Data

US 2017/0061000 A1    Mar. 2, 2017

(30) Foreign Application Priority Data

Aug. 24, 2015  (IN) .......................... 3232/MUM/2015

(51) Int. Cl.
*G06F 17/30* (2006.01)
*G06Q 10/00* (2012.01)

(52) U.S. Cl.
CPC .. *G06F 17/30713* (2013.01); *G06F 17/30716* (2013.01); *G06Q 10/00* (2013.01)

(58) Field of Classification Search
CPC ........ G06F 17/30713; G06F 17/30867; G06F 17/30864; G06F 17/30696; G06F 17/30321; G06F 17/30598; G06F 17/30017
See application file for complete search history.

(56) References Cited

U.S. PATENT DOCUMENTS

| | | | |
|---|---|---|---|
| 9,430,570 B2 * | 8/2016 | Button | G06N 5/043 |
| 9,710,539 B2 * | 7/2017 | Dey | H04L 51/16 |
| 9,977,824 B2 * | 5/2018 | Agarwal | G06Q 10/10 |
| 2003/0191608 A1 * | 10/2003 | Anderson | G06F 11/328 702/189 |
| 2004/0059436 A1 * | 3/2004 | Anderson | G06F 11/328 700/2 |
| 2005/0119960 A1 * | 6/2005 | Martin | G06F 17/3061 705/36 R |
| 2009/0319518 A1 * | 12/2009 | Koudas | G06F 17/30696 |
| 2012/0102050 A1 * | 4/2012 | Button | G06F 17/30867 707/749 |

(Continued)

FOREIGN PATENT DOCUMENTS

| | | |
|---|---|---|
| EP | 1472624 | 11/2004 |
| WO | WO 03/067463 | 8/2003 |
| WO | WO 2008/083504 | 7/2008 |

*Primary Examiner* — Daniel A Kuddus
(74) *Attorney, Agent, or Firm* — Finnegan, Henderson, Farabow, Garrett & Dunner LLP

(57) ABSTRACT

A method and system is provided for analyzing temporal text data. Particularly, the present application provides a method and system for analyzing temporal text data, comprises taking temporal text data as an input from voluminous data sources; implementing text analysis on the input data for information extraction and determination of top concepts; sending the analyzed text to a shared file system for storage purpose; clustering the analyzed text as per frequency distribution of top users, concepts and tag clouds and presenting the results in the form of a visualization dashboard.

8 Claims, 2 Drawing Sheets

(56) References Cited

U.S. PATENT DOCUMENTS

| | | | |
|---|---|---|---|
| 2015/0161237 A1* | 6/2015 | Agarwal | G06Q 10/10 707/749 |
| 2015/0261863 A1* | 9/2015 | Dey | G06F 17/30539 707/709 |
| 2015/0269242 A1* | 9/2015 | Dey | H04L 51/16 707/737 |
| 2016/0134667 A1* | 5/2016 | Suresh | G06F 17/30572 715/753 |
| 2016/0283463 A1* | 9/2016 | M R | G06F 17/2785 |
| 2017/0140244 A1* | 5/2017 | Sharma | G06K 9/6212 |

* cited by examiner

SYSTEM AND METHOD FOR ANALYSING TEMPORAL TEXT DATA

CROSS-REFERENCE TO RELATED APPLICATIONS AND PRIORITY

This U.S. patent application claims priority under 35 U.S.C. § 119 to: India Application No. 3232/MUM/2015, filed on 24 Aug. 2015. The entire contents of the aforementioned application are incorporated herein by reference.

FIELD OF THE INVENTION

The present invention generally relates to analysis of large volumes of data for segregation and clustering of content, and, more particularly, to a method and system for analyzing temporal text data.

BACKGROUND OF THE INVENTION

Widespread digitization has led to an explosion of data, a large volume of which is in the form of unstructured text. Organizations all over the world have become aware of the tremendous potential of text data analytics technologies that can help them understand and serve their customers better through the analysis of consumer generated text which includes both personal and business communications.

In the present scenario, text data analytics is successfully employed by advertisers and market researchers to gain insights about target consumers. However, while these applications do provide insights based on analysis of large volumes of static text data which has been amassed from the past, it is still a challenge for the analysts to understand how the data had changed over time.

Existing prior art illustrating large volumes of static text analysis, particularly email analysis and visualization, has focussed on multiple dimensions of email communication such as social-networks within emails, thread-based communication and temporality using current or archived emails. It visualizes dyadic communications between the mailbox owner and his/her contacts in a temporal order summarizing conversations and the differences between conversations with different contacts.

Dynamically coordinated email analysis and visualisation as proposed in the existing art allows various attributes of emails to be visualized in a chronological manner. A user selects email folders to be visualized and is presented with views of email attributes such as sender and date and the position of the email in a time of day plot and in a folder-wise daily frequency plot. Users can select emails using filters over attributes to observe patterns. Visualizing patterns of correspondence through temporal rhythms to understand relationships with contacts too has been proposed in the prior art. However, such prior art does not disclose analysis of actual content of emails.

Further, prior art also illustrate a system for browsing email archives that evoke memories, which provides interactive visualizations of communication with inferred social groups, recurring named entities, sentimental cues and image attachments. While summarizing, work progress has been reported as an additional feature in the prior art. However, prevalent text analytics methodology and visualization techniques described in prior arts are unable to demonstrate evolution of content of general email inboxes. Temporal visualization of social media platforms such as Twitter as stacked tag clouds has been illustrated in the existing art. The system described therein is populated with a set of buckets with interesting keywords and tweets are filtered based on such set of buckets. Words in the tag cloud are sized according to frequency and coloured according to sentiment. However, such prior art does not address newly emerging topics, which are not covered by one of the pre-configured buckets. Further, prior art fails to compare between topics that are covered by one of buckets.

Thereby, analysis of large volume of text and clustering of said data to demonstrate and visualize how the content of the data has evolved is still considered as one of the biggest challenges of the technical domain.

SUMMARY OF THE INVENTION

Before the present methods, systems, and hardware enablement are described, it is to be understood that this invention is not limited to the particular systems, and methodologies described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention which will be limited only by the appended claims.

In an embodiment of the present invention, a method and system is provided for analysing temporal text data.

In another embodiment of the present invention, a computer implemented method is provided for analyzing temporal text data. The present method comprises of taking temporal text data as an input from voluminous data sources; implementing text analysis on the input data for information extraction and determination of top concepts; sending the analysed text to a shared file system for storage purpose; clustering the analysed text as per frequency distribution of top users, concepts and tag clouds; presenting the results in the form of a visualization dashboard.

In another embodiment of the present invention, a system (200) for analysing temporal text data, the system (200) comprises of a text analytics module (202) which is the backend of the system and a visualisation module (207) which is the frontend of the system (200). The text analytics module (202) takes temporal text data as an, input using an input module (201) and continuously analyses temporal text data with the help of three sub-modules: a cleaning and pre-processing module (203), an information extraction module (204) and a concept determination module (205). The text analytics module (202) writes to the shared file system (206) at regular intervals while the visualisation module (207) streams in the data from the shared file system (206). The visualisation module (207) has three sub-modules: a concept wise frequency distribution module (208), a user wise frequency distribution module (209) and tag-cloud wise distribution module (210). The visualisation module (207) writes and updates a visualisation dashboard (211) after clustering of the analysed data with the help of the three sub-modules.

In yet another embodiment of the present invention, a non-transitory computer readable medium embodying a program executable in a computing device for analyzing temporal text data is provided. The program comprises of taking temporal text data as an input from voluminous data sources; implementing text analysis on the input data for information extraction and determination of top concepts; sending the analyzed text to a shared file system for storage purpose; clustering the analyzed text as per frequency distribution of top users, concepts and tag clouds; presenting the results in the form of a visualization dashboard.

BRIEF DESCRIPTION OF THE DRAWINGS

The foregoing summary, as well as the following detailed description of preferred embodiments, are better understood when read in conjunction with the appended drawings. For the purpose of illustrating the invention, there is shown in the drawings exemplary constructions of the invention; however, the invention is not limited to the specific methods and system disclosed. In the drawings.

DETAILED DESCRIPTION OF THE INVENTION

Figure 1:
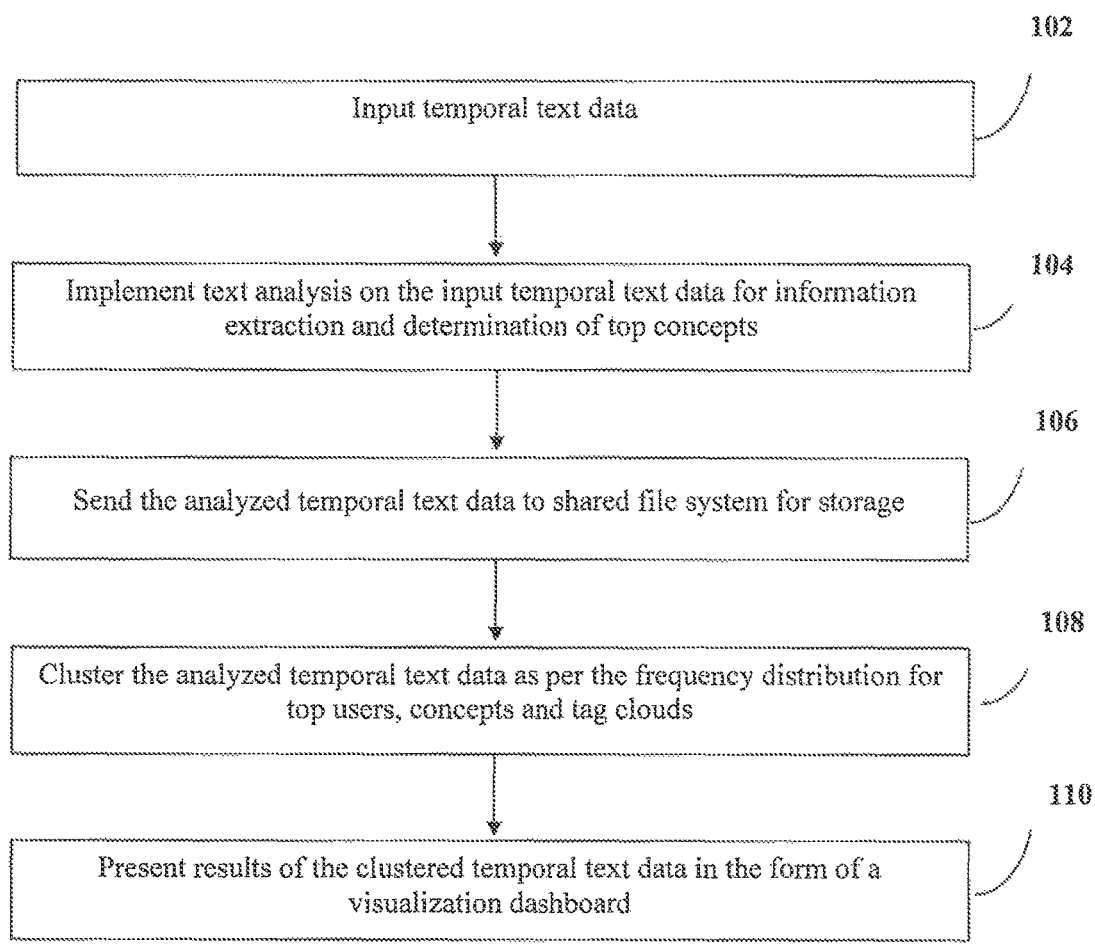
FIG. 1: shows a flow chart illustrating method for analyzing temporal text data.

Some embodiments of this invention, illustrating all its features, will now be discussed in detail.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described. In the following description for the purpose of explanation and understanding reference has been made to numerous embodiments for which the intent is not to limit the scope of the invention.

One or more components of the invention are described as module for the understanding of the specification. For example, a module may include self-contained component in a hardware circuit comprising of logical gate, semiconductor device, integrated circuits or any other discrete component. The module may also be a part of any software programme executed by any hardware entity for example processor. The implementation of module as a software programme may include a set of logical instructions to be executed by a processor or any other hardware entity.

The disclosed embodiments are merely exemplary of the invention, which may be embodied in various forms.

The elements illustrated in the Figures interoperate as explained in more detail below. Before setting forth the detailed explanation, however, it is noted that all of the discussion below, regardless of the particular implementation being described, is exemplary in nature, rather than limiting.

Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk.

The present disclosure provides a computer implemented method and system for analysing temporal text data.

The present disclosure envisages a system which can efficiently parse, analyse and mine information from temporal text data collected from different sources and post analysis efficiently visualize the content evolution occurring within the text repository. Text data can be represented in different ways through the use of words, phrases, concepts, topic etc. The granularity and representation of text is dictated by the application at hand. The system seamlessly integrates the backend text processing components with dynamic front-end visualisation models. The backend text processing components and dynamic front-end visualisation models communicate through a single point of contact where data transfer takes place in a mutually agreed format.

Referring to FIG. 1, it is a flow chart illustrating method for analysis of temporal text data.

The process starts at step 102, temporal text data is taken as an input from voluminous data sources. At step 104, text analysis is implemented on the input data for information extraction and determination of top concepts. At step 106, the analysed text is sent to a shared file system for storage purpose. At step 108, the analysed text is clustered as per the frequency distribution of top users, concepts and tag clouds. The process ends at step 110, the user is presented with the results of the visualisation module in the form of a visualisation dashboard.

Figure 2:
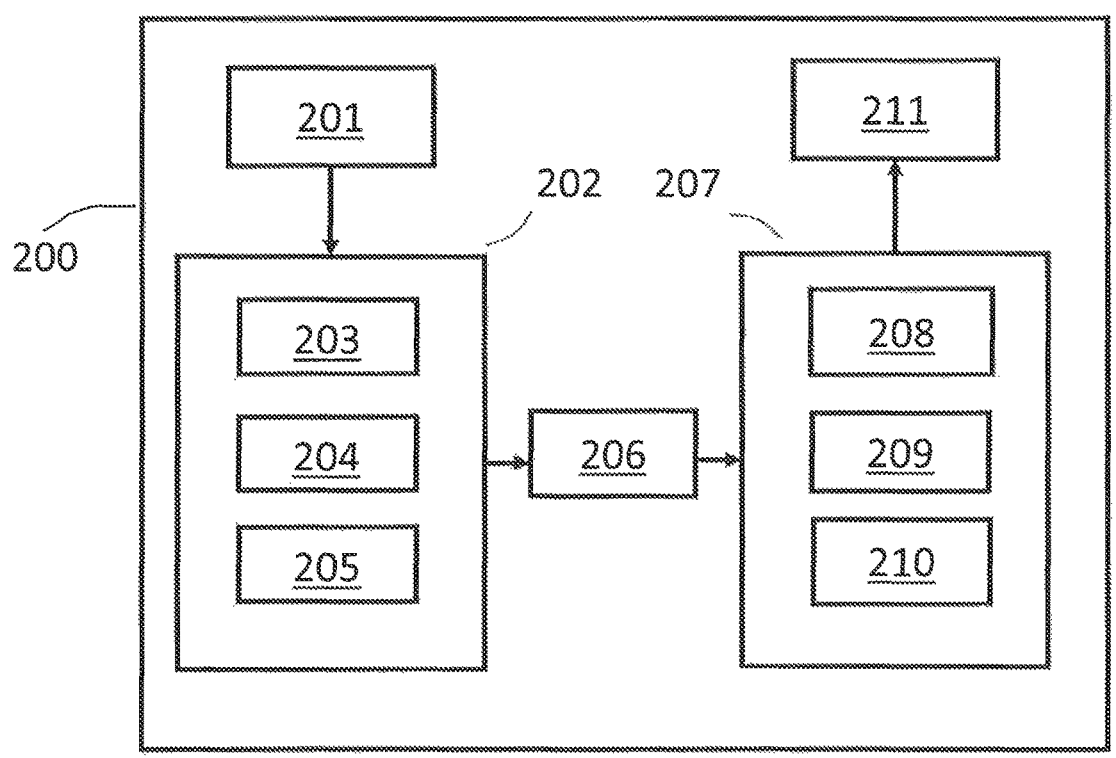
FIG. 2: shows the system architecture for analysis of temporal text data.

Referring to FIG. 2, it represents the system architecture for analysis of temporal text data.

In an embodiment of the present disclosure, a system (200) has two major components: a text analytics module (202) which is the backend of the system (200) and a visualisation module (207) which is the frontend of the system. The text analytics module (202) takes temporal text data as an input using an input module (201) and continuously analyses temporal text data with the help of three sub-modules: a cleaning and pre-processing module (203), an information extraction module (204) and a concept determination module (205). The text analytics module (202) writes to a shared file system (206) at regular intervals while the visualisation module (207) streams in the data from the shared file system (206). The visualisation module (207) writes and updates a visualisation dashboard (211) after clustering of the analysed data with the help of three sub-modules: a concept wise frequency distribution module (208), a user wise frequency distribution module (209) and tag-cloud wise distribution module (210).

The input data to the text analytics module (202) can come from various sources such as emails, Facebook, Twitter, news articles, blogs, etc. The unit of data is assumed to be a time-stamped document which can have additional meta-data selected but not limited to source, author, title, and subject. The text analytics module (202) work on the documents individually and collectively to produce the information components required by the visualisation module (207). The task of the text analytics module (202) is to produce the most frequent concepts that are present in the document collection within a specific time-period. The frequent concepts themselves may change over the time-periods. The concepts themselves may be simple text tag clouds created with frequent words or phrases restricted to be drawn from documents created within a certain period. However, these types of tag-clouds typically cannot bring out the relationship among content encountered over different time-periods and thus cannot show content evolution. Hence it is assumed that a set of universal concepts are present for the entire time-period. The task of the text analytics module (202) is to extract the weighted presence of these concepts in each time-period and thereafter determine the most frequent concepts within that period.

The visualisation module (207) facilitates perception of temporal changes in input temporal text data by providing a recent visual history. The design naturally highlights highs and lows allowing dominant trends, such as viral trending of a particular topic, or the lack of them to be easily identified. Further, it is also possible to determine exact instants where changes in content have occurred in the past. Allowing the user to choose the top important concepts to be displayed together aids self-paced consumption of information. In the current implementation, the system (200) displays content from a voluminous data source containing temporal text data which processes past collection of emails to generate time-stamped output data for visualisation. The visualisation can demonstrate how the temporal text data has changed over time.

In an embodiment of the present disclosure, the text analytics module (202) is adapted for implementing text analysis on the input data for information extraction and determination of top concepts. The data that are collected from various sources contains wealth of information hidden in the form of text. The data are effectively parsed and mined to determine those critical information hidden in the text. The overall aim is to find the set of overlapping clusters where each cluster represents a concept. To determine the concepts, a heuristics-based text clustering algorithm is performed which uses the occurrences of word pairs as explained in [8]. The words are extracted from the document after removal of stop words. For every word pair $w_i$ and $w_j$, the co-occurrence frequency of this pair is computed as $f_{ij}$. The pairs are sorted in decreasing order of their significance where, $$\text{Significance} = \frac{f_{ij}}{\max(d_i, d_j)}$$

where $d_i$ and $d_j$ denote the number of other words with which $w_i$ and $w_j$ respectively co-occur. Hence, the significance of pairs containing highly common words are lower than those containing uncommon ones. The algorithm uses a connectivity_threshold parameter (K) which lies between 0 and 1. A set of $\lambda$ nodes are said to be K—connected to each other, provided each of them is related to at least K $\lambda$number of nodes from this set. When K is equal to 1, the set of nodes are fully connected to each other. The algorithm is explained in the following to determine the concept.

I. Let E be a set of edges, where each edge is denoted by a word pair and has an associated significance as computed above. Keep E sorted by the significance values.

II. Input K and initialize C to Null. C will finally contain a set of independent components, where each component will denote a concept.

III. Repeat steps (a) to (d) until edge E is empty
  a) Remove top most pair e from E.
  b) Is C is empty start a new component C'=e.
  c) Otherwise
    i. For each existing component belonging to C
    ii. Add e to C if the connectivity parameter K holds for that component. If connectivity holds for more than one component, then e is added to all those components.
    iii. If e was not added to any existing component then start a new cluster C'=e.
  d) Update C=C∪C'.

IV. Output C.

The about output is a set of overlapping clusters where each cluster contains word pairs representing a concept. Thus a concept is essentially a set of words which often co-occur with each other and more often with each other than with words outside this component. Each document will have a membership to each of these concepts.

Let $V_i$ denote the set of unique words belonging to document $D_i$. Let $S_k$ denote the set of unique words belonging to cluster $C_k$. The membership of $D_i$ to $C_k$ is given by—

$$\frac{|V_i \cap C_k|}{|V_i \cup C_k|}$$

Finally, each document is assigned to the cluster for which it has the maximum membership. When memberships to multiple clusters are equal, the cluster with the maximum number of documents is assigned, using the winner get all policy. As each such document is time-stamped and allocated to concepts, the presence of concepts in different time intervals can be obtained. For this purpose, the time periods are divided into days, weeks or months. Thereafter the top n concepts that contribute to each time period are computed. This process is executed for the entire duration. Thus for each time period, the top concepts together with their frequency and tag clouds can be identified. The extracted information is then stored in the shared file system in the required format.

In an exemplary embodiment of the implementation of the text analytics module (202), an email repository is analysed and top concepts are clustered and segregated. One of the major challenges in analyzing conversations that take place over email is to group all relevant emails into one thread. None of the email clients have the capability to link emails irrespective of subject, senders and recipients. Emails on a single thread can grow in unprecedented ways with new recipients and senders joining an existing thread at any point in time. Very often, the subject of an existing thread undergoes change to reflect more contemporary issues that is being discussed in it currently than when it was started. Similarly, often a completely new conversation may start from an old chain, with none of the old conversation in it other than the subject and a part of the initial correspondents. This is a common scenario observed by users of Gmail, where an old thread is picked up for convenience of reusing the address of an earlier friend and the subject is not changed inadvertently, though none of the text from the old mail bodies are used. Thus, the first major task of analyzing email repositories is to link all relevant email messages pertaining to a single thread into one group. Each group is then associated to a time-line which contains history of its growth. Each group is also associated to information about participants involved in the group. It contains information about the time and volume of emails generated by each person in the group. Some participants may not be contributors but only be in a group as a recipient. Finally, the voluminous data source is viewed as a collection of groups of emails, each of which spans across large time-periods. A novel text clustering algorithm is employed to extract insights from this large collection. The clustering algorithm does not assign an email group to a single cluster but generates a degree of association of each email to different clusters. Thus a single group may be associated to several clusters at different points of time. Information about dominant clusters at different points of time are stored as text blobs which are passed on to the visualisation platform. The above mentioned process is performed with the help of the following steps:

I. Grouping emails for a single complaint: The algorithm for grouping of emails pertaining to a single complaint is implemented. Each mail group contains not only messages but also history of conversation. The time-stamped messages shows the time taken at each step such as complaint lodged time, response time and resolution time. It also helps to determine the pattern of flow of information from complaint to its resolution.

II. Obtain distinct problem category and identify related problems: A novel clustering algorithm for determining specific problem category is implemented. This module helps us to analyse different types of problems that are being faced by the customer. Each clusters that are formed contains bag of words that tends to co-occur together which signifies a problem relating to a particular category. After having distinct problem category, we assign each mail to a particular category having maximum similarity measure. The similarity is measured using jaccard similarity.

III. Distribution of problem over time: In this step, the distribution of problems over time is tracked. Knowing the time-stamped mails that are belonging to a particular problem category, we can show the distribution of problems over time on a daily, weekly on monthly basis. The statistics determine the top frequent problems or issues that are being lodged by the customer. The analytics can help determine common problems, rare problems and difficult patterns based on the frequency of the problems received over a particular period of time.

In another embodiment of the present disclosure, the visualisation module (207) of the present disclosure uses a dashboard design which is inspired by the well-known small multiples design allowing easy comparison of multiple charts with the same axes and scale. The visualisation for a topic or concept consists of a bar chart of the topic's frequency distribution over a selected time period and a tag cloud of the words or phrases in the topic. Such a chart is displayed for each of the top concepts along a horizontal time axis. Subtle visual cues such as a light background colour are used to indicate vertically, the grouping of the bar chart and tag cloud for a topic and horizontal guidelines for comparison across bar charts for different topics.

The bar chart graphic for a topic shows a bar indicating the number of documents with that topic for the current time as well as for the last k units of time, where k and the unit of time (hour, day, month) may be chosen by the user depending on how much history he/she is interested in and how quickly the source of documents updates. The topic charts are drawn in order of decreasing frequency on the current day. For topics present from day 1, the user sees multiple bars, whereas a new topic emerging on the current day has no history and appears as a single bar in its graphic. The bar for the current day is given a different colour to differentiate it from older bars. The horizontal guidelines allow comparisons to be made across topics on days for which the order may be different. Opacity and position of bars are used to create a visual trend of changes in topic frequency. Setting the opacity of a bar to 50% and its position so that it overlaps with the next bar by 50%, creates darker areas where bars overlap and lighter ones where they do not. Since shorter bars completely overlap with taller bars on either side, darker areas indicate continuous occurrence of the topic and low or similar frequency, whereas lighter areas indicate non-occurrence or high frequency.

The graphic for each topic also contains a tag cloud representing it. The current day's words are displayed with a solid colour and font size mapped to their respective weights computed by the text analytics module (202). Old words that are not reported on the current day are faded out gradually with font size equal to their last reported date. Thus, a change in the tag cloud also captures the history of changes in the topic's list of words. Often it is useful to see the distribution of mails or documents in a cluster using certain criteria such as content severity or top contributors. This is enabled by converting the bars in the bar chart graphic to stacked bars.

What is claimed is:

1. A method for analyzing temporal text data to provide visualization of content evolution of the temporal text data, the method performed by a hardware processor and comprising:
    collecting the temporal text data as an input from voluminous data sources using an input module;
    implementing text analysis on the collected temporal text data for information extraction and determination of top concepts using a text analytics module;
    writing, at regular intervals, the analysed text to a shared file system for storage purpose;
    clustering the analysed text as per frequency distribution of top users, concepts and tag clouds using a visualisation module, wherein the visualisation module performs the clustering of the analysed text as per frequency distribution of top users, concepts and tag clouds using a concept wise frequency distribution module, a user wise frequency distribution module and tag-cloud wise distribution module; and
    presenting the results post the clustering in the form of a visualization dashboard.

2. The method as claimed in claim 1, wherein the text analytics module performs implementation of the text analysis on the collected temporal text data for information extraction and determination of top concepts using a cleaning and pre-processing module, an information extraction module and a concept determination module.

3. The method as claimed in claim 1, wherein the text analytics module works on the collected temporal text data individually and collectively for information extraction and determination of top concepts.

4. The method as claimed in claim 1, wherein the visualisation module is configured to provide perception of temporal changes in the collected temporal text data by providing a recent visual history.

5. The method as claimed in claim 1, wherein the visualization dashboard demonstrates the manner the collected temporal text data has changed over time.

6. A system for analyzing temporal text data to provide visualization of content evolution of the temporal text data, the system comprising:
- a hardware processor;
- a data bus coupled to the hardware processor; and
- a computer-usable medium embodying computer code, the computer-usable medium being coupled to the data bus, the computer program code comprising instructions executable by the hardware processor and configured for operating:
  - an input module configured to collecting the temporal text data as an input from voluminous data sources;
  - a text analytics module configured to implementing text analysis on the collected temporal text data for information extraction and determination of top concepts;
  - a shared file system configured to storing, at regular intervals, the analysed text;
  - a visualisation module configured to clustering the analysed text as per frequency distribution of top users, concepts and tag clouds, wherein the visualisation module further comprises a concept wise frequency distribution module, a user wise frequency distribution module and tag-cloud wise distribution module; and
  - a visualization dashboard configured to presenting the results post the clustering.

7. The system as claimed in claim 6, wherein the text analytics module further comprises of a cleaning and pre-processing module, an information extraction module and a concept determination module.

8. A non-transitory computer readable medium embodying a program executable in a computing device for analyzing temporal text data to provide visualization of content evolution of the temporal text data, the program comprising:
- a program code for collecting the temporal text data as an input from voluminous data sources;
- a program code for implementing text analysis on the collected temporal text data for information extraction and determination of top concepts;
- a program code for writing, at regular intervals, the analysed text to a shared file system for storage purpose;
- a program code for clustering the analysed text as per frequency distribution of top users, concepts and tag clouds, wherein the clustering of the analysed text as per frequency distribution of top users, concepts and tag clouds uses a concept wise frequency distribution module, a user wise frequency distribution module and tag-cloud wise distribution module; and
- a program code for presenting the results post the clustering in the form of a visualization dashboard.

* * * * *